United States Patent [19]

Houghton

[11] Patent Number: 4,744,385

[45] Date of Patent: May 17, 1988

[54] WATER SUPPLY AND WASTE REMOVAL SYSTEM FOR A VEHICLE

[76] Inventor: William H. Houghton, 317 Moffat, Sp. #5, P.O. Box 630, Manteca, Calif. 95336

[21] Appl. No.: 90,182

[22] Filed: Aug. 27, 1987

[51] Int. Cl.[4] .............................................. E03C 1/00
[52] U.S. Cl. ................................ 137/255; 137/637.1; 4/663
[58] Field of Search ............ 137/255, 256, 637, 637.1; 4/663, 664; 296/24 R

[56] References Cited

U.S. PATENT DOCUMENTS 1,849,324  3/1932  Goldsborough ..................... 137/256
3,594,825  7/1971  Reid ........................................ 4/663

Primary Examiner—Alan Cohan
Attorney, Agent, or Firm—Henderson & Sturm

[57] ABSTRACT

The above-entitled system is especially useful in recreational vehicles but is obviously adaptable to other arrangements. As obviously applied to a recreational vehicle (RV) having a fresh water tank, a grey tank and a waste tank, the system includes a plurality of electrically activated valves, one for each tank, so arranged as to be individually operated exclusive of each other in a convenient sequence for filling the water tank, draining and rinsing the grey tank and finally draining and rinsing the waste tank. The grey and waste tanks are connected to a water supply line by separate lines, each of which includes spray nozzles assuring cleansing of the tanks. A pump is provided in conjunction with the water for use in the event of a situation in which an external water source—such as city water—is not available.

6 Claims, 1 Drawing Sheet

WATER SUPPLY AND WASTE REMOVAL SYSTEM FOR A VEHICLE

BACKGROUND ART

A recreational vehicle (hereinafter RV) is conventionally equipped with three tanks: a fresh water tank, a grey tank and a waste tank. In typical practice, the water tank is periodically filled with fresh water when available. The other two tanks are drained or dumped into facilities commonly provided at campgrounds, roadside parks, etc. In one form of draining and dumping operation, the grey and waste tanks are dumped and then a hose is connected to a source of water under pressure and water is directed into the tanks to flush out any remaining waste, etc. In the case of the waste tank, the hose is directed into the stool with the flush pedal valve open, a procedure that often results in overflow and resulting damage to the interior of the RV. Very often the aid of service personnel at the dumping facility is enlisted and possible errors and carelessness are multiplied.

DISCLOSURE OF INVENTION

According to the present invention, the foregoing and other disadvantages are eliminated and a simple, convenient system is provided for performing the supply, dump and flush tanks. To this end, the invention features a water supply line connectable to an external supply source, such as a city water outlet usually available at, say, a camp site. The supply line is branched off to the water, grey and waste tanks by separate lines in parallel and each line includes an electrically operated valve operative to selectively open and close its line. A control panel is provided with a plurality of separate switches, one for each tank. Electrical potential is supplied by, for example, the 12-volt D.C. battery of the RV. The switches are arranged so that only one switch at a time may be energized to actuate its respective valve. A check valve is furnished in the supply line upstream of the tank lines in order to prevent back flow into the supply source. Further a pump is furnished for pumping water from the water tanks to the other tanks in the event that an external water source is not available.

Further features and advantages of the invention will become apparent as a preferred embodiment of the invention is disclosed in the ensuing description and accompanying drawing.

BEST MODE FOR CARRYING OUT THE INVENTION

Familiarity with the structure and nature of a typical RV will be assumed and, therefore, description of the details of that structure is deemed to be unnecessary.

Figure 1:
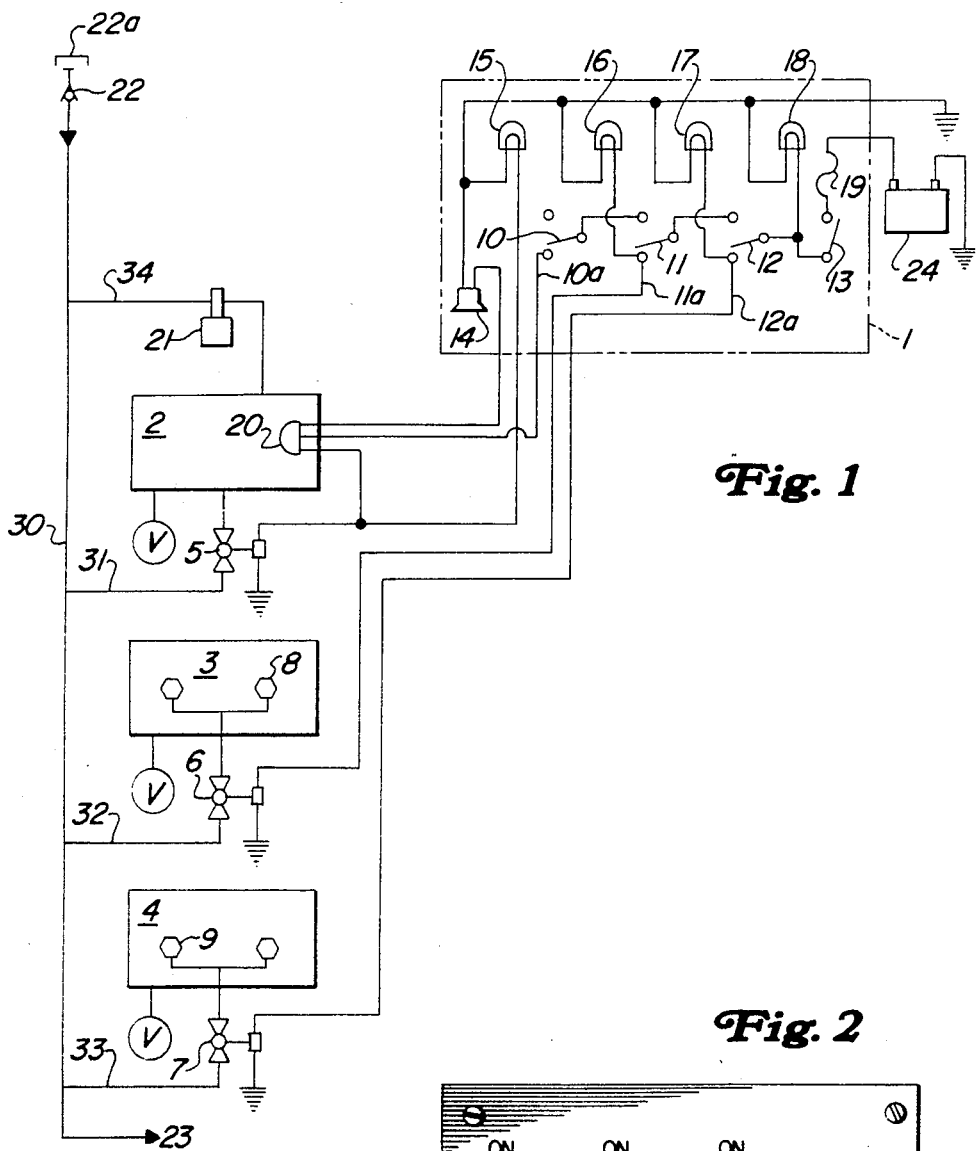
FIG. 1 is a schematic layout of the tanks and water and electrical systems.
Figure 2:
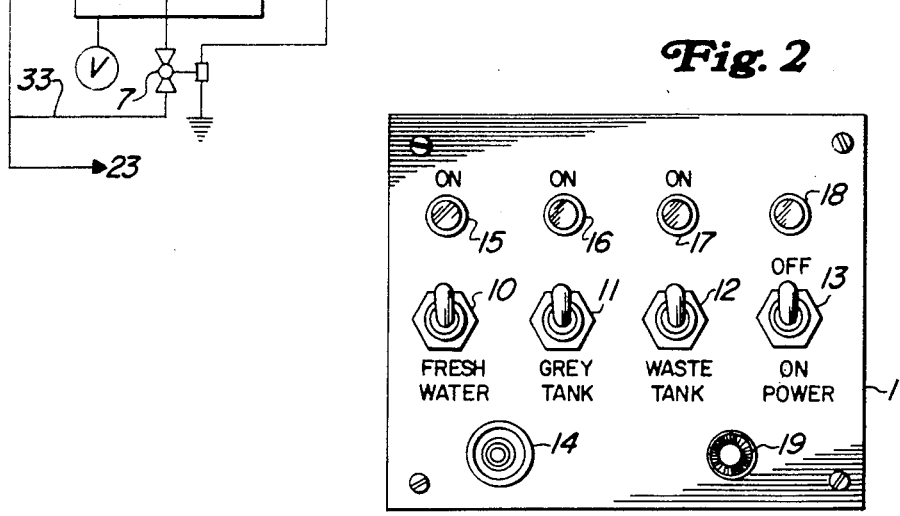
FIG. 2 is a face view of a representative control panel on which the tank valve switches and signal means may be arranged.

With reference to FIGS. 1 and 2, there is provided a main control panel (1) that may be placed at any convenient location in or on the RV, preferably in an easy access location to the person operating the system. As is typical, the RV is equipped with a fresh water tank (2), a grey tank (3) and a waste tank (4). Those versed in the art know that the grey tank receives discharge from the vehicle sink and shower and the waste tank serves the toilet. The sink, shower and toilet are, of course, not shown. Each tank is shown in schematic fashion as having a drain or dump valve V, each of which may be of any known design. A water supply line (30) is typically connectable at one end, via a check valve (22), to an external water supply source (22a); e.g., a city water outlet at which water under pressure is available. This line (30) may lead at (23) to the regular water facilities in the RV, such as the sink and shower faucets, toilet flush box, etc. Again these facilities are not shown since they are assumed to be present in the environment chosen for pruposes of the present disclosure. The tanks may be conveniently located in any manner in or under the vehicle and the supply line may be conveniently routed to accommodate the tanks and RV facilities, all of which is subject to many variations and per se forms no part of the present invention.

Downstream of the supply source, the line (30) is connected with three branch lines (31), (32) and (33) for the tanks (2), (3) and (4) respectively. The line (31) communicates with the water tank (2) via a valve (5), here of the electro-magnetic type. The line (32) communicates with the tank (3) by means of a similar electromagnetic value (6) for controlling flow to flushing nozzles (8), and a like value (7) and nozzles (9) are provided in the line (33) for the waste tank (4). The nozzles may be of any known type. A fourth branch line (34) is connected to the supply line (30) upstream of the branch lines (31), (32) and (33) and communicate with the water tank (2), and a pump (21) is interposed in the line (34) for use in the event that a water source such as (22a) is not at hand. The pump includes a built-in check valve (not shown because the pump is standard equipment) for preventing city water, when used, from flowing past the pump and into the tank (2), possibly causing overfilling and subsequent damage to the tank or at least spillage into undesirable areas. As a precaution against the foregoing, the water tank (2) is equipped with a micro-switch (20) of the single pole, double throw type, about which more will be set forth in connection with the electrical circuit.

Previous reference has been had herein to the control panel (1), which carries a plurality of electrical switches and switch-relatd signals. As also previously indicated, the system is energized by as 12-v. D.C. source, such as the battery (24). Appropriate grounds are shown by recognized symbols. These switches include a switch (10) for the water tank (2), a switch (11) for the grey tank (3), a switch (12) for the waste tank (4) and a power-on/-off switch (13) connected to the battery through a typical fuse (19). The switches (10), (11) and (12) are of the single pole, double throw type, each having an upper and a lower position; although, the upper position for the switch (10) is not used in this embodiment of the invention. Appropriate signal lamps (15), (16), (17) and (18) are provided for the switches and an audible signal (14) is provided in the line associated with the micro-switch (20). As indicated before herein, the wiring is so designed that, of the switches (10), (11) and (12), only one can be energized at a time as regards the tank valve it will control.

In use and operation, all switches (10, (11) and (12) will be in their "up" positions, in which case the switch (12) connects the switch (13) to the switch (11) and the switch (11) connects to the switch (10). Thus, when the power switch (13) is closed current flows through switches (12) and (11) to the switch (10) but not to the lower terminals of the switches (11) and (12). Hence, all the lines (12a), (11a) and (10a) are pen. The operating sequence is first to close the switch (13), which will be signalled by the green lamp (18). The switch (10) is then closed energize the line (10a) which goes to the switch (20). If the water level is lower, the green lamp (15) will light and the valve (5) will open to allow the tank to fill. When filling is completed, the switch (20) will switch over to its second position to close the valve (5), at which time the green lamp (15) will go off and the signal (14) will sound.

In the meantime, tanks (3) and (4) can be connected to drain or dump. When the user hears the signal (14), he will turn the switch (11) on and the green lamp (16) will glow and the valve (6) will open to spray flushing water into the tank (3) via the nozzles (8). After the tank (3) is clean, the switch (11) is turned off and the switch (12) is turned on, signaled by illumination of the green lamp (17), and the valve (7) opens to admit flushing water to the tank (4) via the nozzles (9). When the tank (4) is considered clean, the switches are all turned off. The basic purpose of arranging the switches for individual and exclusive operation is to obtain maximum water pressure in the main line (30).

As will be seen from the foregoing, the novel arrangement is simple, compact and convenient and is not likely to get out of order. Existing RVs may be readily equipped with the system and manufactured RVs will have the system factory installed. It will also be appreciated that only a preferred embodiment of the invention has been disclosed and that many modifications, additions, etc. may be made without departing from the spirit and scope of the invention.

I claim:

1. A water supply and waste removal system for a vehicle having a fresh water tank, a grey tank and a waste tank, comprising:

a water supply line connectable to a water source external to the vehicle;
    a fill water line communicating the supply line with the water tank and including a normally closed electric valve;
    a grey water line connected to the supply line downstream of the fill water line and communicating with the grey tank and including a normally closed electric valve;
    a waste water line connected to the supply line downstream of the grey water line and communicating with the waste tank and including a normally closed electric valve, electrical control means for operating the valves including a power on/off switch, a fill line switch wired to the fill line valve, a grey line switch wired to the grey line switch, and a waste line switch wired to the waste line valve, said switches being electrically arranged so that, with the power on/off switch in "on" mode, only one of the water line, grey line and waste line switches may be switched to "on" mode at any one time.

2. The system of claim 1, in which each of the grey and waste line communications with their respective tanks include spray nozzles for flushing said tanks.

3. The system of claim 1, including a pump for pumping water from the water tank to the supply line in the absence of connection to the external water source, 4. The system of claim 1, in which the grey tank and waste tank switches are of the single-pole, double-throw type normally arranged in such mode as to lead current to the water fill switch and selectively operative in opposite modes to connect to their respective valves.

5. The system of claim 1, in which the supply line includes a check valve upstream of the water fill, grey and waste lines and operative to prevent reverse flow from the supply line to the external source.

6. The system of claim 1, including a water-level-responsive switch in the fresh water tank for closing the water fill valve when the water tank is full.

* * * * *

UNITED STATES PATENT AND TRADEMARK OFFICE
CERTIFICATE OF CORRECTION

PATENT NO. : 4,744,385
DATED : May 17, 1988
INVENTOR(S) : William H. Houghton

It is certified that error appears in the above-identified patent and that said Letters Patent are hereby corrected as shown below:

In the Abstract, line 14 "water" should be --water tank--.

At Column 1, line 28 "tanks" should be --tasks--; at Column 1, line 40 "valve. A check valve is furnished in the supply line" should be --valve. A further feature is that the grey and waste lines include nozzles for flushing the respective tanks. A check valve is furnished in the supply line--.

At Column 2, line 14 "pruposes" should be --purposes--; at Column 2, line 65 "(10" should be --(10)--.

Signed and Sealed this

Eleventh Day of October, 1988

Attest:

DONALD J. QUIGG

*Attesting Officer*       *Commissioner of Patents and Trademarks*